United States Patent [19]

Deutz et al.

[11] Patent Number: 6,113,955
[45] Date of Patent: Sep. 5, 2000

[54] TOMATO PRODUCTS AND PROCESSES THEREFOR

[75] Inventors: Inge Elisabeth Deutz, Vlaardingen, Netherlands; Laure Christiane Fraysse, Corronsac, France; Hendrikus Theodorus van der Hijden, Vlaardingen, Netherlands

[73] Assignee: Lipton, division of Conopo, Inc., Englewood Cliffs, N.J.

[21] Appl. No.: 09/094,744

[22] Filed: Jun. 15, 1998

[30] Foreign Application Priority Data

Jun. 16, 1997 [EP] European Pat. Off. .............. 97304211

[51] Int. Cl.[7] ...................................... A23L 1/212
[52] U.S. Cl. ................................ 426/52; 426/51; 426/49; 426/534; 426/518; 426/520
[58] Field of Search ................................ 426/49, 51, 52, 426/534, 518, 520

[56] References Cited

U.S. PATENT DOCUMENTS 5,436,022  7/1995  Chiang et al. ........................... 426/626

OTHER PUBLICATIONS

Weenan et al. Colloq.—Inst. Natl. Rech. Agron. vol. 75, p. 375–380, 1995.
Eriksson et al. ACS Symp. Ser., vol. 47, p. 132–142, 1977.
Mitchell et al., J. Am. Soc. Hortic. Sci., vol. 120 (5), p. 798–801, 1995.
Bultery et al., J. Agric. Food Chem., vol. 35, p. 540–544, 1987.

Prestage, S., Linforth R.S.T., Taylor, A.J., Lee, E., Speirs, J. & Schuch, W. (Zeneca Seeds, UK). Volatile production in tomato fruit with modified alcohol dehydrogenase activity. J. Sci. Food Agric. (1999) 79 131–136 (Abstract).

Teruyoshi Matoba et al., n–Hexanol Formation from n–Hexanal by Enzyme Action in Soybean Extracts, Journal of Food Science, vol. 54, No. 6, 1989, pp. 1607–1610.

Gremli et al., Enzymatic Flavor Regneration in Processed Food, Proceedings Fourth International Congress Food Science and Technology, vol. 1, 1974, pp. 158–161.

Sieso et al., Constituants Volatils de la Tomate: Mise en Evidence et Formation par Voie Enzymatique du Trans–Hexene–2–OL, Agricultural and Biological Chemistry, vol. 40, No. 12, 1976, pp. 2349–2353.

Seitz Eugene W., Natural Flavor Substances Engendered by Microorganisms and Enzymes, Abstracts of Papers, American Chemical Society, vol. 176, Florida 1978.

*Primary Examiner*—Chhaya D. Sayala
*Attorney, Agent, or Firm*—Gerard J. McGowan, Jr.

[57] ABSTRACT

A process for manipulating the aroma profile of tomato products comprises the steps of a) adding an enzyme with alcohol dehydrogenase activity to a plurality of tomato pieces; b) adding either a cofactor of alcohol dehydrogenase or an electron donor to the plurality of tomato pieces; and c) incubating the plurality of tomato pieces. Volatile flavor compounds such as C6 aldehydes are reduced to C6 alcohols, thereby changing the sensory attributes of tomato products. Alternatively, C6 alcohols are oxidized to C6 aldehydes by repeating process steps a to c, but replacing an electron donor with an electron acceptor.

13 Claims, No Drawings

TOMATO PRODUCTS AND PROCESSES THEREFOR

FIELD OF THE INVENTION

The present invention relates to a process for manipulating the aroma of tomato products, and to products prepared by the process.

BACKGROUND ART

Tomatoes are an important food source. They are consumed either raw or in a processed state; it is common to prepare sauces or soups from them.

The popularity of tomatoes may be ascribed to their sweet-sour fresh flavour, which is dependent on their sugar to acid ratio and a combination of at least four hundred volatile aroma compounds which are released or generated when the tomato fruit is cut. For example, aldehydes and alcohols having 6 carbon atoms (C6) contribute to the fresh green aroma of tomatoes; they are generated by lipid oxidation.

To prepare tomato-based products, fresh tomatoes are traditionally processed using either a cold or a hot break process, in which tomatoes are comminuted and heated to temperatures of about 65 and 85° C. respectively. A concentrated tomato product is prepared by evaporation of water from these comminuted and heated tomatoes. However, many volatile aroma compounds such as C6 aldehydes and C6 alcohols are released into the atmosphere during these processes, resulting in a significant loss of the desirable green aroma of fresh tomatoes.

An alternative method for producing concentrated tomato products is to use reverse osmosis to separate solids and liquids. In the separated solids, volatile aroma compounds such as C6 aldehydes are retained in relatively high amounts. However, C6 aldehydes are detrimental to aroma quality in higher concentrations, since the aroma becomes too green and thus grassy and chemical, rather than moderately green and fresh.

Typically, fresh tomato homogenate comprises from 5.0 to 20.0 ppm C6 aldehydes and from 0.2 to 6.0 ppm C6 alcohols; concentrated tomato paste prepared using the hot break process and evaporation comprises from 0 to 0.2 ppm C6 aldehydes and from 0 to 0.1 ppm C6 alcohols; concentrated tomato paste prepared using reverse osmosis comprises from 0.1 to 20 ppm C6 aldehydes and from 0.1 to 20 ppm C6 alcohols.

In U.S. Pat. No. 5,436,022, pre-ripened whole tomatoes are blanched in hot water to inactivate surface enzymes, cooled, macerated in the presence of added alkali and alcohol to provide a slurry having a pH of 4.7–5.1, acidified and subjected to a traditional hot-break process. During the maceration step, endogenous enzymes are released and effect enzymatic reactions. The resulting tomato products are sweeter, more fruity and less sour than tomato products prepared by conventional hot break processes. This is because the activities of the enzymes responsible for the development of the desired fruity and sweet taste are utilised before the hot break process is used to inactivate them.

An article in the Journal of Food Science, vol 54, no 6, 1989, p 1607–1610 relates to the formation of n-hexanol from n-hexanal by enzyme action in soybean extracts. At a pH of 8–9, it is assumed that n-hexanal is reduced by endogenous alcohol dehydrogenase to produce n-hexanol (although no specific enzyme is shown). The presence of cofactors NADH and NADPH is stated to be necessary for this reduction to occur. The conversion of n-hexanal to n-hexanol is said to be useful in reducing the intensity of the grassy, beany, green flavours of n-hexanal.

In relation to tomatoes, "Constituents Volatils de la Tomato: Mise en evidence et Formation par Voie Enzymatique du tran-Hexene-2-ol" in the Agr. Biol. Chem., 40(12), 2349–2353, 1976 discusses the action of isolated alcohol dehydrogenase on trans-2-hexenal to produce trans-2-hexenol.

SUMMARY OF THE INVENTION

According to the present invention there is provided a process for manipulating the aroma profile of tomato products, the process comprising the following steps:
 a) adding an enzyme with alcohol dehydrogenase activity to a plurality of tomato pieces;
 b) adding either a cofactor of alcohol dehydrogenase, an electron donor or an electron acceptor to the plurality of tomato pieces; and
 c) incubating the plurality of tomato pieces.

In step b, in order to manipulate the aroma profile by reducing C6 aldehydes to C6 alcohols, either the electron donor or the reduced from of the cofactor is added.

Alternatively, in order to manipulate the aroma profile by oxidising C6 alcohols to C6 aldehydes, either the electron acceptor or the oxidised from of the cofactor is added in step b. Preferably, either an electron donor or an electron acceptor is added to the plurality of tomato pieces, depending on whether reduction or oxidation is desired.

According to the present invention there is also provided a tomato product comprising from 0.025 to 0.5 ppm, preferably from 0.05 to 0.3 ppm, more preferably from 0.075 to 0.15 ppm C6 aldehydes, and from 0.1 to 10 ppm, preferably from 0.5 to 8 ppm, more preferably from 1 to 5 ppm C6 alcohols.

These levels of C6 aldehydes and C6 alcohols provide a tomato product having an aroma which is perceived as superior to the aroma of known tomato products; a tomato product of the present invention has an aroma which is fresh, not too green and not over-processed or unnatural.

A plurality of tomato pieces is, for example, chopped, diced, comminuted or homogenised tomatoes. The tomato pieces may be subject to treatments such as heat, reverse osmosis or evaporation before or after conducting the process of the present invention.

Since tomato products are generally acidic, the pH of the tomato pieces is preferably from 3.5 to 7, more preferably the pH is 5.8.

The enzyme with alcohol dehydrogenase (ADH) activity may be sourced from the cells of plants, animals or microorganisms. For example, it is extracted from tomato cells, yeast cells and liver cells.

Yeast extract comprises an enzyme with ADH activity and an electron donor; it may therefore be added to tomato pieces during the process of the present invention to provide the enzyme and the electron donor when reduction of C6 aldehydes is required.

Cofactors of ADH include nicotinamide adenine dinucleotide NAD; nicotinamide adenine dinucleotide phosphate NADP; and flavine-adenine dinucleotide FAD. The reduced form of NAD is NADH; the oxidised form is $NAD^+$. The reduced form of NADP is NADPH; the oxidised form is $NADP^+$. The reduced form of FAD is FADH; the oxidised from is $FAD^+$.

When NADH is added as a cofactor to a tomato product comprising C6 aldehydes, the enzyme having alcohol dehydrogenase activity catalyses the following reaction during the incubation step:

C6 aldehyde+NADH+H$^+$⇌C6 alcohol+NAD$^+$

As a result, a substantial proportion of the C6 aldehydes released or generated from the tomato pieces are reduced to C6 alcohols.

Alternatively, the reaction may act in the opposite direction by adding NAD$^+$ to oxidise C6 alcohols to C6 aldehydes.

Both C6 aldehydes and C6 alcohols contribute to the aroma profile of tomatoes, but differently. Hence, this process is useful for manipulating the aroma of tomato products. For example, hexanal is reduced to hexanol and cis-3-hexenol is oxidised to cis-3-hexenal.

The addition of an electron donor or acceptor is preferred to the addition of the cofactor NAD since NAD$^+$ is endogenous in tomato pieces. Hence, addition of an electron donor such as ethanol or of an electon acceptor such as acetalaldehyde leads to the following reactions during the incubation step; these reactions are catalysed by the enzyme having ADH activity:

ethanol+NAD$^+$+H$^+$⇌acetalaldehyde+NADH

C6 aldehyde+NADH⇌C6 alcohol+NAD$^+$+H$^+$ the net reaction being:

ethanol+C6 aldehyde⇌acetalaldehyde+C6 alcohol

Hence, when C6 aldehydes are reduced to C6 alcohols, NADH is generated from NAD$^+$ using ethanol, so there is no need to use exogenous NADH. When C6 alcohols are oxidised to C6 aldehydes, acetalaldehyde is used to regenerate NAD$^+$. This is advantageous as NADH and NAD$^+$ are expensive to buy for separate addition.

In place of ethanol, other organic alcohols may be used as the electron donor. In place of acetalaldehyde, other organic aldehydes may be used as the electron acceptor.

The incubation step may be allowed to proceed until all the C6 aldehydes have been reduced to C6 alcohols or all the C6 alcohols have been oxidised to C6 aldehydes. Alternatively, the incubation step may be prematurely terminated by inactivating the enzyme having ADH activity; this prevents any further reduction or oxidation. Hence, termination of the incubation step regulates the degree of reduction or oxidation which occurs, thereby dictating the relative concentrations of C6 alcohols and C6 aldehydes in the final product. The enzyme having ADH activity is inactivated by, for example, heating the tomato pieces (eg for 10 mins at 100° C.) or adding inhibitors such as pyrazole and 4-methyl pyrazole.

The amount added of the enzyme having alcohol dehydrogenase activity may be from 0.1 U/ml to 1000 U/ml; preferably from 0.1 to 10 U/ml; more preferably from 0.1 to 0.5 U/ml.

At room temperature, the incubation time may be from 1 to 60 minutes, and is preferably less than 30 minutes. Under optimal conditions, most of the C6 aldehydes are reduced to C6 alcohols, or most of the C6 alcohols are oxidised to C6 aldehydes, within 15 minutes of incubation. At other temperatures, the preferred incubation times may be different.

The present invention is more effective than the process disclosed in the soybean article mentioned above: according to FIG. 1 of the soybean article, less than 50% of the hexanal in soybeans is reduced after 90 minutes; in the present invention, greater than 85% of the hexanal is reduced after 15 minutes (see example B3 below).

The soybean article utilises only endogenous enzymes having alcohol dehydrogenase (ADH) activity; the addition of an isolated enzyme having ADH activity is not disclosed.

Although alcohol dehydrogenase occurs naturally in tomatoes, the endogenous capacity is not sufficient for catalysis of the reduction of most C6 aldehydes to C6 alcohols, or of the oxidation of most C6 alcohols to C6 aldehydes, even in the presence of added cofactor.

The soybean article is also silent on the cofactor amounts required to achieve the superior reduction and oxidation effects of the present invention.

In accordance with the present invention, when NADH or NAD$^+$ is added, the amount used may be from 10 $\mu$M to 500 $\mu$M. When ethanol or acetalaldehyde is added, the amount used may be from 1 $\mu$M to 60,000 $\mu$M (ie less than 0.3% ethanol or acetalaldehyde in the product, wt/wt); preferably less than 40,000 $\mu$M of ethanol or acetaldehyde is used, more preferably less than 20,000 $\mu$M.

The relative concentrations of C6 aldehydes and C6 alcohols in the resulting tomato product is, in part, dictated by the amount of cofactor or electron donor/acceptor added. Hence, the reduction of C6 aldehydes or the oxidation of C6 alcohols may be controlled via a predetermined dosage of the cofactor or the electron donor/acceptor.

In the absence of sufficient enzyme having alcohol dehydrogenase activity and its cofactor or an electron donor/acceptor, the ratio of C6 aldehyde to C6 alcohol, by weight, may be 49.5 in a fresh tomato homogenate product (see example A2 below). In the presence of sufficient enzyme having alcohol dehydrogenase activity and its cofactor or an electron donor/acceptor, the ratio of C6 aldehyde to C6 alcohol, by weight, may be 0.04 (see example A6 below).

Using the process of this invention, the volatile aroma compounds typical of fresh tomatoes can be generated in processed tomato products such as pastes and sauces. Moreover, the levels of these volatile aroma compounds in the tomato products can be regulated, so that the flavour is not overly green or grassy.

For example, for concentrated tomato products prepared using reverse osmosis, where C6 aldehyde concentrations are often undesirably high, reduction of C6 aldehydes to C6 alcohols in the concentrated product improves its sensory attributes. Alternatively, C6 aldehydes may be reduced to C6 alcohols in a tomato homogenate prior to reverse osmosis, resulting in a concentrated tomato product which does not have an undesirably high concentration of C6 aldehydes.

Concentrated tomato products prepared using a break process followed by evaporation often have undesirably low C6 aldehyde concentrations. This is due to loss of the C6 aldehydes during processing. The present invention may be used to increase the C6 aldehyde concentrations in such products, resulting in improved sensory attributes.

This is achieved using the following process:

i) homogenising tomatoes in the presence or absence of heat;

ii) reducing C6 aldehydes in the tomato homogenate to C6 alcohols by adding an enzyme with alcohol dehydrogenase activity and either a reduced form of a cofactor of alcohol dehydrogenase or an electron donor; and incubating the homogenate;

iii) optionally heating the homogenate;

iv) evaporating the tomato homogenate to from a concentrated tomato product;

v) oxidising C6 alcohols in the concentrated tomato product to C6 aldehydes by adding an enzyme with alcohol dehydrogenase activity and either an oxidised form of a cofactor of alcohol dehydrogenase or an electron acceptor to the tomato product; and incubating the tomato product.

This process increases the levels of C6 aldehydes in the final product by "protecting" them during evaporation as a result of converting them into C6 alcohols, which are better preserved than C6 aldehydes during evaporation. The C6 alcohols are converted back to C6 aldehydes at the end of the process.

The final incubation step may be prematurely terminated, by inactivation of the enzyme having ADH activity, in order to regulate the degree of oxidation which occurs, thereby dictating the relative concentrations of C6 alcohols and C6 aldehydes in the final product.

Since both C6 alcohols and C6 aldehydes contribute to the fresh green aroma of tomatoes, step v may be omitted altogether, since the C6 alcohols formed in step ii and retained during evaporation may be sufficient to improve the fresh perception of a tomato product.

DETAILED DESCRIPTION OF THE INVENTION

Examples of the products and processes of the invention will now be described to illustrate, but not to limit, the invention.

Purification of Alcohol Dehydrogenase

Crude extract

Tomatoes were washed with distilled water, sliced in quarters and homogenised in a blender (maximum speed) for 30 s in 1 M Tris-HCl pH 7.4, 20% glycerol, 5 mM 1,4-dithiothreitol (DTT), 1 mM ethylene diamine N,N'diacetic acid (EDTA) (0.8 ml/g fruit). The pH was adjusted to 7.4 with 6 M NaOH at room temperature. The homogenate was then centrifuged at 4° C., 12200 g for 40 min. The supernatant, after filtration on a quick filtration material such as cheese cloth, constituted the crude extract.

Ammonium sulphate precipitation

The crude extract was precipitated on ice with 35% saturation of ammonium sulphate and centrifuged under the same conditions as described above. The supernatant was then brought to 65% saturation. After a final centrifugation run, the pellet was redissolved in 0.05 M Tris-HCl, pH 7.4, 20% glycerol, 1 mM DTT. Before gel filtration, this fraction had to be centrifuged to remove turbidity.

All further procedures were performed at 4° C.

Gel filtration Sepadex G-25™

The fraction was then loaded on a Sephadex G-25™ column (5×9 cm), obtainable from Pharmacia Biotech, equilibrated and eluted with 0.05 M Tris-HCl, pH 7.4, 20% glycerol, 1 mM DTT. The active fractions were pooled and analyzed for protein concentration and ADH activity.

Anion exchange chromatography

The active fraction of the gel filtration was applied to a diethylaminoethyl (DEAE) Sepharose™ column (5×6.5 cm), obtainable from Pharmacia Biotech, equilibrated with 0.05 M Tris-HCl, pH 7.4, 20% glycerol, 1 mM DTT. The column was eluted with a linear gradient of NaCl 0–0.5 M in 0.05 M Tris-HCl, pH 7.4, 20% glycerol, 1 mM DTT. The active fractions were pooled and the solution obtained was assayed for protein content and ADH activity.

Affinity chromatography

The enzyme solution was finally applied to a Blue Sepharose CL-6B™ column (1.8×9.5 cm), obtainable from Pharmacia Biotech. The affinity chromatography material Cibacron Blue F3G-A™ (also from Pharmacia Biotech) binds several proteins, especially enzymes requiring adenyl-containing cofactors (including $NAD^+$ and $NADP^+$). An elution with a specific cofactor of the protein of interest allows a good separation. Thus ADH was eluted with a linear gradient of $NAD^+$ 0–0.5 mM in Tris buffer. The active fractions collected constituted the purified ADH.

Gel filtration Sephadex G-25™

$NAD^+$ was removed from the solution of purified enzyme by performing a gel filtration on a Sephadex G-25™ column (5×9.5 cm), equilibrated with 0.05 M Tris-HCl buffer, pH 7.4, 20% glycerol, 1 mM DTT. The elution was achieved with the same buffer.

The fractions containing ADH activity were then frozen and stored in 0.5 ml portions at 20° C.

Tomato alcohol dehydrogenase activity assay

ADH activity was determined by measuring the increase in absorbance $A_{340nm}$ due to NADH production in the reaction. The slope of the curve $A_{340nm}=f(time)$ was calculated within the first two minutes of the reaction (linear part of the curve $A_{340nm}=f (time)$). One unit is defined as the amount of enzyme catalysing the formation of 1 $\mu$M NADH per min. ($\Sigma_{340}=6220$ $M^{-1}.cm^{-1}$ for NADH)

The reaction mixture consisted of 50 mM ethanol, 1 mM $NAD^+$ in 0.5 M glycine-NaOH buffer, pH 9.6 and 50 to 150 $\mu$l enzyme solution. The reaction was performed in a 1 cm-pathlength cuvette in a final volume of 1.5 ml at room temperature, and was initiated by addition of the enzyme.

During the purification, activity in the fractions collected after chromatography was routinely monitored by use of the Cobas-Mira™ analyzer, which is an automated apparatus for spectrophotometric assays and analyses, obtainable from Hoffman La Roche; this analyzer allowed reduced volumes of enzyme and reagents. Those measurements were performed at 30° C. in a total volume of 100 $\mu$l.

Results

The enzyme was purified approximately 94-fold with an overall yield of 39% and a specific activity of 52.35 u/mg.

Experiments A to D

In experiment A, the effects of pH, cofactor NADH and tomato ADH were considered. In experiment B, the effects of incubation time and of yeast ADH were studied. Experiment C checked the influence of the concentration of cofactor NADH on the extent of the conversion of C6-aldehydes in the tomato. In experiment D, an alternative of the addition of NADH was tried: ethanol was added to the samples in various concentrations; its ADH-catalysed oxidation was accompanied by the reduction of $NAD^+$ into NADH, which was then consumed in the C6-aldehydes reduction.

All samples comprised 0.5 ml of a tomato homogenate and 0.5 ml of aqueous solution. To make the homogenate, red ripe tomatoes were blended in a blender for 30 s. The homogenate obtained was immediately added to the aqueous solution, to avoid a loss of volatiles by evaporation. The aqueous solution contained 100 $\mu$l of the buffer used to make the aqueous solution, saturated with $O_2$ (10% oxygen saturation), to allow the action of lipoxygenase, essential for the formation of C6-aldehydes. The samples were incubated at room temperature for 30 min. The samples were made in vials which were closed airtight before incubation. After incubation, the samples were rapidly frozen on dry ice and stored at −80° C. for analysis.

Volatile analysis of the tomato samples

A method using a Tekmar™ dynamic headspace (model LSC2000 available from Interscience) and a Gas Chromatograph—Flame Ionisation Detector (model Carlo Erba 8000, available from Interscience) and based on the work of Buttery[1] was used for the quantification of the volatiles in the samples. A porous absorbing polymer mesh (based on 2,6-diphenyl-p-phenylene oxide) was used for absorbing aromas; a suitable mesh is available from Interscience under the name Tenax™. The mesh provides minimum interference with the blended tomato and therefore avoids a large part of the degradation of the enzyme-produced flavour compounds either by other tomato enzymes or during the volatile isolation.

([1]Buttery R G, Teranishi R and Ling; Fresh tomato aroma volatiles, a quantitative study, J Agric Food Chem (1987) 35, 540–544).

Using this procedure, the different volatiles were extracted from the sample by a purge and trap technique with a Tekmar™ trapping system and Tenax™ as absorbing material. The volatiles were then thermally desorbed, cryofoccused, prior to their analysis with the Gas Chromatograph—Flame Ionisation Detector.

Before analysis all samples were thawed within 20 min. 20 μl tomato sample, 80 μl milli Q water and 100 μl internal standard 2-methyl-cyclohexanon (0.115 mg/l) were weighed into a 5 ml U-shaped glass vessel for analysis.

In order to identify the volatiles corresponding to the different peaks, the retention times of the compounds of interest were determined with volatile reference substances. In these experiments, the volatiles considered were hexanal, Z-3-hexenal, E-2-hexenal and 3-methylbutanal for the aldehydes and hexanol, Z-3-hexenol and 3-methyl-butanol for the alcohol.

The response factors of the reference substances and peak area of the internal standard were used for the quantification of the volatiles in the tomato samples. The response factors of these volatiles were determined each day with a standard solution containing the volatile reference substances.

The reference substances and the internal standard were made at a concentration of 0.1 mg/ml for each component, in 35:65 ethanol and water (boiled for 15 min with He purge) solution. This stock was diluted in water to obtain the final concentration of approximately 10 ng/200 μl for each compound.

The volatile concentrations reported below are an average of two measurements. The resulting data was converted to "μM in the sample".

Experiment A (samples A1 to A6)

The pH of samples A-1 and A-3 was the natural pH of tomato homogenate (around 4.2). The aqueous solution did not contain any buffer, except water. A solution of 15 mM NADH in water was used for sample A-3.

In samples A-2, A-4, A-5 and A-6, the pH was 5.8. The 500 μl of aqueous solution were therefore prepared in 0.05 M Na-pyrophosphate buffer, pH 8.1.

A solution of pure tomato ADH was prepared as follows: the buffer of a fraction of the purified enzyme was exchanged by the use of a gel filtration column NAP 5™ (from Pharmacia Biotech), equilibrated and eluted with 0.05 M Na-5 pyrophosphate buffer, pH 8.1; the fraction obtained was then concentrated to obtain 10.5 U/ml of ADH activity. The solution of cofactor contained 15 mM NADH prepared in 0.05 M Na-pyrophosphate buffer, pH 8.1.

The final conditions in the samples are listed in the following table.

| Sample | Aqueous solution | pH | concentration of added NADH (mM) | Tomato ADH added (U/ml) |
|---|---|---|---|---|
| A-1 | Water | 4.2 | 0 | 0 |
| A-2 | Na-Pyrophosphate | 5.8 | 0 | 0 |
| A-3 | Water | 4.2 | 0.3 | 0 |
| A-4 | Na-Pyrophosphate | 5.8 | 0.3 | 0 |
| A-5 | Na-Pyrophosphate | 5.8 | 0 | 2.5 |
| A-6 | Na-Pyrophosphate | 5.8 | 0.3 | 2.5 |

Results

| Sample | Hexanal μM | Z3-hexenal μM | E2-hexenal μM | Hexanol & E2-hexenol* μM | Z3-hexenol μM |
|---|---|---|---|---|---|
| A-1 | 21.4 | 31.6 | 10.0 | 0.1 | 0.1 |
| A-2 | 20.4 | 13.7 | 15.4 | 0.6 | 0.4 |
| A-3 | 21.1 | 32.8 | 10.0 | 0.2 | 0.3 |
| A-4 | 18.3 | 14.8 | 12.9 | 3.3 | 12.3 |
| A-5 | 20.8 | 17.9 | 15.1 | 0.9 | 2.0 |
| A-6 | 1.2 | 0.2 | 0.3 | 12.1 | 33.9 |

*the peaks of these two alcohols coincided on the column used

Influence of pH

Without added ADH, no significant conversion of C6-aldehydes into C6-alcohols was observed at pH 4.2, either in the absence or presence of cofactor NADH: the C6-aldehydes were predominant, with a concentration of 63.0 μM, whereas the C6-alcohols concentration was 0.2 μM. On the contrary, without added ADH and at pH 5.8, augmentation in the alcohol level was noticed, either in the presence or the absence of NADH, from 1 μM in sample A-2 to 15.6 μM in sample A-4. In the presence of NADH, this was coupled to a decrease of C6-aldehydes concentration from 49.5 μM to 27.7 μM, suggesting that reduction of C6-aldehydes does take place at pH 5.8.

Influence of NADH & ADH

In the absence of added cofactor, the presence of ADH in large quantities, (2.5 U/ml sample) in comparison with the mean quantity of ADH in tomato (0.5 U/ml pure tomato), produced a slight increase of the C6-alcohols level. Combining the effects of tomato ADH and of the cofactor NADH enabled the disappearance of 96% of the C6-aldehydes (hexanal, Z-3-hexenal and E-2-hexenal) on the one hand, and the formation of Z-3-hexenol and hexanol on the other hand. Use of the cofactor NADH and the enzyme ADH, together with a pH 5.8, converts the majority of the C6-aldehydes into C6-alcohols in tomato homogenate.

Experiments B, C, D (samples B1 to B6, C1 to C4, D1 to D4, I1 to I7)

All the samples of these experiments were prepared in 0.1 Na-pyrophosphate buffer pH 6.8; the final pH of the samples was 5.8.

Samples B-2, B-3, B-4, B-5 and B-6 contained 20 μl of a solution of 15 mM NADH (0.3 mM final concentration) prepared in the previously cited buffer.

The solutions of pure tomato ADH for these experiments were prepared as follows: the buffer of a fraction of the purified enzyme was exchanged by the use of a gel filtration column NAP 5™ (available from Pharmacia Biotech), equilibrated and eluted with 0.1 M Na-pyrophosphate buffer, pH 6.8; the fraction obtained contained 3.0 U/ml of tomato ADH activity.

The solution of yeast ADH was prepared in the same buffer and contained 384 U/ml of yeast ADH activity. The yeast ADH activity was determined using the same method as for the tomato ADH activity. The assay mixture contained 0.1 M Na-phosphate buffer, pH 8.8, 0.5 M ethanol, 1 mM $NAD^+$ and between 20 and 40 μl of enzyme solution, in a total volume of 1.5 ml.

The solutions of cofactor NADH were made in the buffer cited above. The solutions of ethanol were prepared in water. The final conditions in the samples are listed in the following tables.

Experiment B

| Samples | pH | [NADH] added (mM) | Tomato ADH added (U/ml) | Yeast ADH added (U/ml) | Incubation Time (min) |
|---|---|---|---|---|---|
| B-1 | 5.8 | 0 | 0 | 0 | 30 |
| B-2 | 5.8 | 0.3 | 0 | 0 | 150 |
| B-3 | 5.8 | 0.3 | 0.6 | 0 | 15 |
| B-4 | 5.8 | 0.3 | 0.6 | 0 | 30 |
| B-5 | 5.8 | 0.3 | 0.6 | 0 | 60 |
| B-6 | 5.8 | 0.3 | 0 | 19.2 | 30 |

Experiment C

| Samples | pH | [NADH] added (μM) | Tomato ADH added (U/ml) | Ethanol added (mM) |
|---|---|---|---|---|
| C-1 | 5.8 | 0 | 0 | 0 |
| C-2 | 5.8 | 50 | 0.7 | 0 |
| C-3 | 5.8 | 25 | 0.7 | 0 |
| C-4 | 5.8 | 0 | 0.7 | 6 |

Experiment D

| Samples | pH | [NADH] added (μM) | Tomato ADH added (μM) | Ethanol added (mM) |
|---|---|---|---|---|
| D-1 | 5.8 | 0 | 0 | 0 |
| D-2 | 5.8 | 0 | 0.5 | 1 |
| D-3 | 5.8 | 0 | 0.5 | 6 |
| D-4 | 5.8 | 0 | 0.5 | 30 |

Experiment I

| Samples | pH | [NADH] added (μM) | Yeast ADH added (μM) | Ethanol added (μM) |
|---|---|---|---|---|
| I-1 | 5.8 | 0 | 0 | 0 |
| I-2 | 5.8 | 0 | 2 | 30 |
| I-3 | 5.8 | 0 | 20 | 30 |
| I-4 | 5.8 | 0 | 40 | 30 |
| I-5 | 5.8 | 0 | 2 | 60 |
| I-6 | 5.8 | 0 | 20 | 60 |
| I-7 | 5.8 | 0 | 40 | 60 |

Results Experiment B

| Sample | Hexanal μM | Z3-hexenal μM | E2-hexenal μM | Hexanol & E2-hexenol* μM | Z3-hexenol μM |
|---|---|---|---|---|---|
| B-1 | 20.8 | 4.6 | 14.9 | 0.2 | 0.4 |
| B-2 | 17.9 | 2.5 | 12.4 | 1.3 | 3.1 |
| B-3 | 2.8 | 0.6 | 0.8 | 10.4 | 33.3 |
| B-4 | 1.9 | 0.3 | 0.7 | 11.5 | 34.2 |
| B-5 | 1.1 | 0.2 | 0.5 | 12.0 | 33.8 |
| B-6 | 1.0 | 0.2 | 0.5 | 12.5 | 34.9 |

Influence of time

In order to determine the time required to achieve the reduction of C6-aldehydes, the quantity of added enzyme was lowered to 0.5 U/ml and the time of incubation of the samples was varied. The pH and NADH concentration were kept constant at respectively 5.8 and 0.3 mM. The major part of C6-alcohols appeared within the first 15 min of incubation. The C6-alcohols concentration increased from 0.6 μM in the reference without enzyme and cofactor (sample B-1) up to 43.7 μM after 15 min incubation. Between 15 and 60 min, the concentration of C6-alcohols increased from 43.7 μM to 45.8 μM. The increases in the C6-alcohols concentration were accompanied by decreases in the C6-aldehydes concentration in the same order. The mass balance was conserved, since the concentration of C6-volatiles was approximately the same in all samples of experiment B.

C6-alcohols represented 25% of the total C6-volatiles in presence of cofactor, without added tomato ADH, with an incubation time of 30 min (sample A-4). In sample B-2, under the same conditions but incubated for a 5-fold longer period, only 12% of C6-alcohols were obtained.

Experiment C

| Sample | Hexanal μM | Z3-hexenal μM | E2-hexenal μM | Hexanol & E2-hexenol* μM | Z3-hexenol μM |
|---|---|---|---|---|---|
| C-1 | 12.5 | 14.3 | 6.2 | 0.4 | 1.2 |
| C-2 | 5.3 | 1.4 | 1.8 | 6.0 | 20.4 |
| C-3 | 9.3 | 6.4 | 3.2 | 2.6 | 14.9 |
| C-4 | 8.2 | 5.5 | 3.4 | 3.7 | 14.0 |

Influence of NADH concentration

Since the complete reduction of C6-aldehydes can be performed with a concentration of ADH of 0.5 U/ml, the quantity of NADH added was varied to modulate the extent of the reaction, with an incubation time of 30 min. Increasing concentrations of cofactor led to increasing levels of C6-alcohols formed: the ratios C6-aldehydes/C6-alcohols obtained without added NADH, with 25 μM NADH and with 50 μM NADH were 67, 1.1 and 0.3 respectively. In samples A-6 and B-4, with 0.3 mM NADH and an addition of ADH, ratios between 0.04–0.06 were obtained. The ratio of the C6-aldehydes/C6-alcohols can be regulated over a wide range by the amount of NADH added.

| | | Experiment D | | | |
|---|---|---|---|---|---|
| Sample | Hexanal μM | Z3-hexenal μM | E2-hexenal μM | Hexanol & E2-hexenol* μM | Z3-hexenol μM |
| D-1 | 36.9 | 46.8 | 12.0 | 0.4 | 1.3 |
| D-2 | 30.8 | 38.9 | 9.3 | 2.0 | 8.0 |
| D-3 | 25.5 | 26.4 | 6.8 | 5.1 | 19.5 |
| D-4 | 19.1 | 16.2 | 4.6 | 8.0 | 29.2 |

Effect of ethanol

In sample C-4, containing 6 mM ethanol, C6-alcohols were formed while lower levels of C6-aldehydes were observed. Thus, ethanol oxidation regenerates NADH from $NAD^+$ in tomato homogenate. Experiment D aimed at confirming this hypothesis. Increasing concentrations of ethanol between 1 and 30 mM resulted in increasing levels of C6-alcohols. The ratios C6-aldehyde/C6-alcohol obtained were 56, 8, 2.5 and 1 with 0 mM, 1 mM, 6 mM and 30 mM ethanol respectively.

Effect of yeast ADH concentration and ethanol concentration

The results of the addition of different levels of yeast ADH and ethanol at pH 5.8 are shown in the table above. The different enzyme and ethanol concentrations showed no noticeable differences in their C6-aldehyde/C6-alcohol conversion. The amount of C6-aldehydes is decreased, whereas the amount of C6-alcohols increased. Ethanol can be used to replace NADH as cofactor.

| | | Experiment I | | | |
|---|---|---|---|---|---|
| Sample | Hexanal μM | Z3-hexenal μM | E2-hexenal μM | Hexanol & E2-hexenol* μM | Z3-hexenol μM |
| I-1 | 993 | 1951 | 1386 | 0 | 92 |
| I-2 | 684 | 542 | 797 | 307 | 2418 |
| I-3 | 650 | 494 | 799 | 352 | 2564 |
| I-4 | 550 | 417 | 674 | 322 | 2478 |
| I-5 | 635 | 503 | 811 | 357 | 2878 |
| I-6 | 576 | 450 | 744 | 355 | 2888 |
| I-7 | 526 | 395 | 674 | 352 | 2660 |

Action of yeast ADH

20 U/ml of yeast ADH was added to the tomato homogenate, with 0.3 mM NADH and 30 min. incubation (sample B-6). The result observed was approximately equivalent to the one obtained with 0.5 U/ml of added tomato ADH under the same conditions (sample B-4): the ratio C6-aldehydes/C6-alcohols was lowered from 67 in sample B-1 to 0.04 in the sample in presence of yeast ADH and cofactor. This suggests that the isolated endogenous ADH can be replaced by an exogenous ADH, commercially available from enzyme suppliers.

Experiments E & F

In experiment E, the method of experiment B, sample B-6, was repeated using an excess of yeast ADH. In experiment F, the method of experiment B, sample B-6, was repeated but using an excess of liver ADH. A control sample was used. The following table shows the amounts (in ppb) of the specified C6 aldehydes and C6 alcohols in the control sample and in the samples of experiments E and F after carrying out the process of the present invention.

| | Results | | |
|---|---|---|---|
| | Control | Yeast ADH | Liver ADH |
| hexanal | 4401 | 411 | 159 |
| Z-3-hexenal | 4540 | 176 | 81 |
| E-2-hexenal | 2349 | 0 | 0 |
| hexanol | 45 | 4143 | 1235 |
| Z-3-hexenol | 80 | 7010 | 5835 |
| E-2-hexenol | 0 | 654 | 108 |

Experiment G (samples G1 to G5)

To five samples of a 12° Brix tomato paste, different levels of a mix of C6 aldehydes was added, as detailed in the two left hand columns of the table below. This mix consisted of 1200 ppm Z-3-hexenal, 300 ppm hexanal & 30 ppm E-2-hexenal. A sample of the paste alone was used as a control.

For each sample, the aroma attributes of "chemical" and "trimmed hedge" were measured by a trained sensory panel; the results are shown in the table below.

A chemical attribute is a measure of the unnatural/chemical aroma of a tomato product. A trimmed hedge attribute is a measure of the perception of greeness. These attributes are each measured on a scale of 0 to 100, with a score of 0 meaning that the aroma in question was not perceived. A score of 50 indicates a very high level of perception of a trimmed hedge aroma. A score of 30 indicates a very high level of perception of a chemical aroma.

| | Results | | |
|---|---|---|---|
| Sample | aldehyde mix added (mg/kg paste) | Chemical | Trimmed Hedge |
| Control | 0 | 15 | 18 |
| G-1 | 25 | 9 | 27 |
| G-2 | 50 | 9 | 24 |
| G-3 | 100 | 13 | 28 |
| G-4 | 250 | 20 | 43 |
| G-5 | 500 | 23 | 48 |

Of the sensory attributes, the trimmed hedge and chemical attributes increased significantly with increasing aldehyde concentrations, showing that aldehydes are responsible for the green impression of tomato products.

Experiment H (samples H1 to H6)

To six samples of a 12° Brix tomato paste, different levels of a C6 aldehyde mix and a C6 alcohol mix were added, as detailed in the three left hand columns of the tables below. The C6 aldehyde mix consisted of 1200 ppm Z-3-hexenal, 300 ppm hexanal & 30 ppm E-2-hexenal. The C6 alcohol mix consisted of 1200 ppm Z-3-hexenol, 300 ppm hexanol & 30 ppm E-2-hexenol. The total amount of C6 aldehyde mix and C6 alcohol mix added was 500 mg per kg paste. A sample of the paste alone was used as a control.

For each sample, the aroma attributes of "chemical" and "trimmed hedge" were measured by a trained sensory panel, in accordance with experiment G above; the results are shown in the following table.

| Sample | Results | | | |
|---|---|---|---|---|
| | Added C6 aldehyde mix (mg/kg paste) | Added C6 alcohol mix (mg/kg paste) | Chemical | Trimmed Hedge |
| Control | 0 | 0 | 7 | 14 |
| H-1 | 0 | 500 | 9 | 14 |
| H-2 | 25 | 475 | 10 | 15 |
| H-3 | 50 | 450 | 9 | 18 |
| H-4 | 100 | 400 | 8 | 15 |
| H-5 | 250 | 250 | 14 | 24 |
| H-6 | 500 | 0 | 16 | 35 |

This experiment mimics the conversion of C6 aldehydes into C6 alcohols. The samples having the most alcohol added had similar scores in respect of the trimmed hedge and chemical attributes as the control, whereas the samples having more aldehyde added had significantly higher scores for these two attributes than the control.

This shows that the relative concentrations of C6 aldehydes and C6 alcohols in a product is important to its sensory attributes.

It also illustrates that, when a product has a C6 aldehyde concentration that is considered to be too high because it provides an impression that is too green and grassy, conversion of the C6 aldehydes into C6 alcohols reduces the green and grassy impression and improves the sensory attributes of the product.

Experiment J
Bench-scale test

Yeast ADH and ethanol are used for the regulation of C6-aldehyde and C6-alcohol in processing trials on bench scale, in which water is removed through reverse osmosis. In order to do so, fruit (tomatoes) was washed, sorted and chopped in pieces of approx. 5×10×10 mm. Two portions of 70 kg each were prepared, (1) and (2), the latter being the control (no ADH and ethanol added). For each portion the pH was adjusted to aprox. 5.8 by adding a NaOH solution. To the mass of trial (1), tomato ADH was added in an amount of 2 U/g, and 60 mM ethanol was added. The obtained mixture was gently stirred in a cold pan for 30 minutes. Hereafter, the tomato mass was subjected to a cold-break process, by heating to 65° C. and holding for 15 minutes. Thereafter the tomato mass was cooled to a temperature of 35–40° C., and filtered over a 1 mm screen (refining). Following this, the product was concentrated using reverse osmosis to a concentration of 14° Brix. The product was packed in 150 g pouches, using vacuum and nitrogen flush, after which the products were frozen at −18° C. After defrosting the amounts of C6-aldehydes and C6-alcohols were determined as other examples. Trial (2) was a blank, in which no ADH and ethanol have been added, otherwise processing was the same as for (1) above.

The results of the measurements are set out the table below.

| | Experiment J | | | | |
|---|---|---|---|---|---|
| Sample | Hexanal $\mu$M | Z3-hexenal $\mu$M | E2-hexenal $\mu$M | Hexanol & E2-hexenol* $\mu$M | Z3-hexenol $\mu$M |
| J-1 | 2798 | 138 | 1703 | 7748 | 13380 |
| J-2 | 8078 | 143 | 2915 | 1763 | 1987 |

We claim:

1. A process for manipulating the aroma profile of tomato products, the process comprising the following steps:
   a) adding an enzyme with alcohol dehydrogenase activity to a plurality of tomato pieces;
   b) adding either a cofactor of alcohol dehydrogenase, an electron donor or an electron acceptor to the plurality of tomato pieces; and
   c) incubating the plurality of tomato pieces.

2. A process as claimed in claim 1 comprising the step of inactivating the enzyme with alcohol dehydrogenase activity after step c.

3. A process as claimed in claim 2 wherein the enzyme with alcohol dehydrogenase activity is inactivated using a heat treatment or by adding inhibitors.

4. A process as claimed in claim 1 wherein, after step c, the plurality of tomato pieces comprises from 0.025 to 0.5 ppm C6 aldehydes and from 0.1 to 10 ppm C6 alcohols.

5. A process as claimed in claim 1 wherein the cofactor of alcohol dehydrogenase is in a reduced form.

6. A process as claimed in claim 1 wherein the cofactor of alcohol dehydrogenase is in an oxidised form.

7. A process as claimed in claim 1 wherein the enzyme with alcohol dehydrogenase activity is added in an amount of from 0.1 to 1000 Units per ml of tomato pieces.

8. A process as claimed in claim 1 wherein the enzyme with alcohol dehydrogenase activity is sourced from cells of the group consisting of plants, animals, microorganisms and mixtures thereof.

9. A process as claimed in claim 1 wherein the cofactor of alcohol dehydrogenase is selected from the group consisting of NAD, NADP, FAD and mixtures thereof.

10. A process as claimed in claim 1 wherein the electron acceptor is an organic aldehyde.

11. A process as claimed in claim 1 wherein the electron donor is an organic alcohol.

12. A tomato product prepared using the process claimed in claim 1.

13. A tomato product comprising from 0.025 to 0.5 ppm C6 aldehydes and from 0.1 to 10 ppm C6 alcohols.

* * * * *